(12) United States Patent
Müller

(10) Patent No.: US 6,729,212 B2
(45) Date of Patent: May 4, 2004

(54) METHOD FOR MACHINING ELECTRICALLY CONDUCTIVE WORKPIECES WITH A CUTTING TOOL

(76) Inventor: Roland Müller, Blieskasteler Wg 15a, 65453 Gersheim-Herbitzhelm (DE)

( * ) Notice: Subject to any disclaimer, the term of this patent is extended or adjusted under 35 U.S.C. 154(b) by 0 days.

(21) Appl. No.: 10/137,927

(22) Filed: May 2, 2002

(65) Prior Publication Data

US 2002/0129682 A1 Sep. 19, 2002

Related U.S. Application Data

(63) Continuation of application No. PCT/DE00/03849, filed on Nov. 2, 2000.

(30) Foreign Application Priority Data

Nov. 2, 1999 (DE) .......................... 199 52 807

(51) Int. Cl.[7] .............................. B23B 1/00; B23B 5/02
(52) U.S. Cl. ........................................ 82/1.11; 82/112
(58) Field of Search .................. 82/1.11, 112, 117, 82/118, 128, 133, 134

(56) References Cited

U.S. PATENT DOCUMENTS 4,158,319 A * 6/1979 Blockley et al. ............... 82/3
4,532,713 A * 8/1985 Feichtinger .................. 33/559
5,802,937 A * 9/1998 Day et al. .................... 82/1.11

FOREIGN PATENT DOCUMENTS

| DE | 1 085 009 C | 7/1960 |
| DE | 196 33 942 A | 2/1998 |
| DE | 197 27 094 A | 1/1999 |
| GB | 2 319 615 A | 5/1998 |

* cited by examiner

Primary Examiner—Willmon Fridie, Jr.
(74) Attorney, Agent, or Firm—Henry M. Feiereisen; Ursula B. Day

(57) ABSTRACT

In a method for machining an electrically conductive workpiece with a cutting tool, an electric circuit is applied between the cutting tool and the workpiece which is positioned electrically insulated from the cutting tool, when the workpiece is subjected to a machining operation. At least one electric variable is determined and evaluated in the electric circuit during the machining operation. The advance of the workpiece is adjusted after each machining step of an entire surface of the workpiece, and the machining operation is terminated, when the at least one variable remains substantially constant during a machining step.

12 Claims, 5 Drawing Sheets

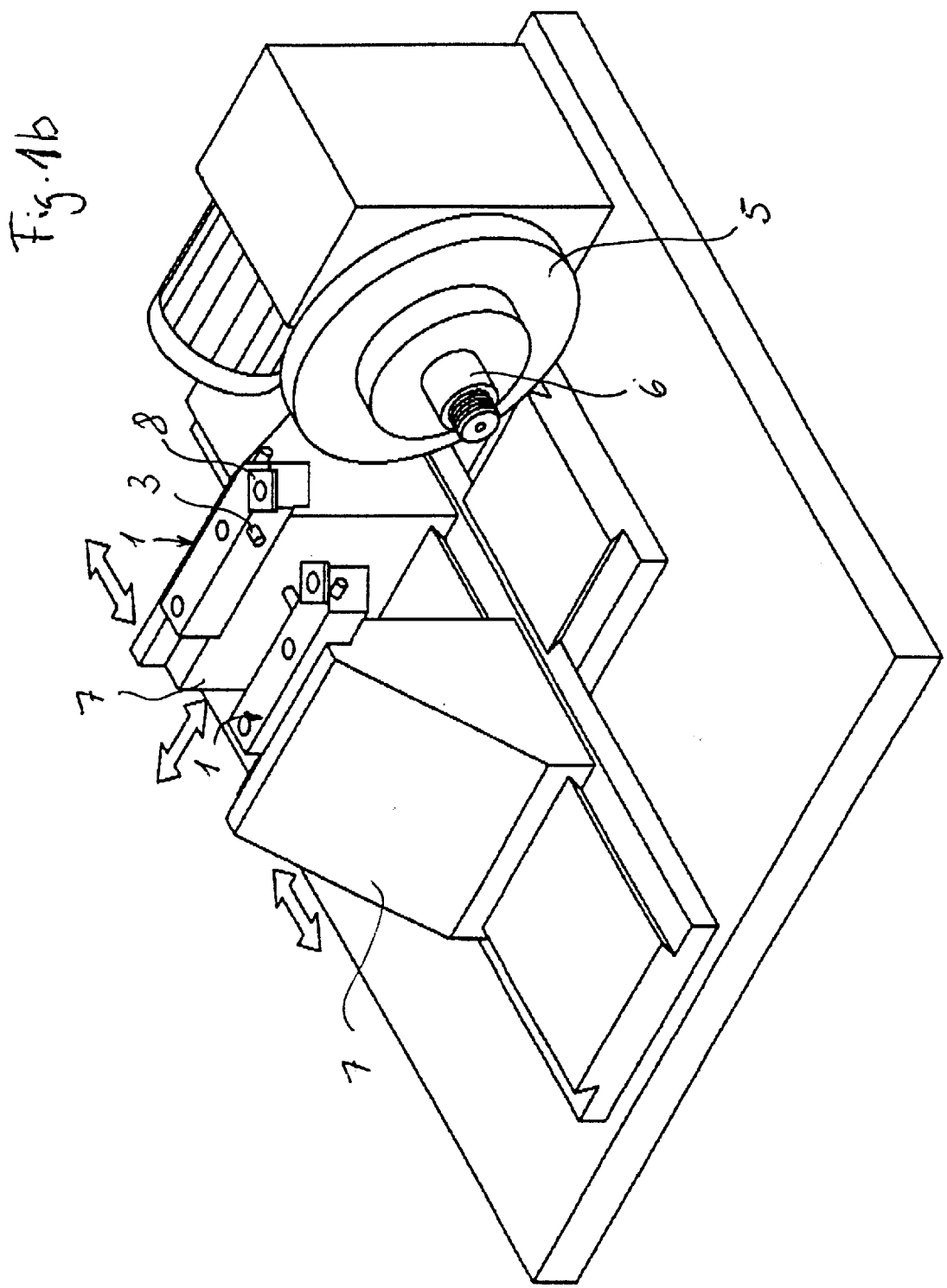

METHOD FOR MACHINING ELECTRICALLY CONDUCTIVE WORKPIECES WITH A CUTTING TOOL

CROSS-REFERENCES TO RELATED APPLICATIONS

This application is a continuation of prior filed copending PCT International application No. PCT/DE00/03849, filed Nov. 2, 2000.

This application claims the priority of German Patent Application Serial No. 199 52 807.1, filed Nov. 2, 1999, pursuant to 35 U.S.C. 119(a)–(d), the subject matter of which is incorporated herein by reference.

BACKGROUND OF THE INVENTION

The present invention relates to a method of machining electrically conductive workpieces with a cutting tool. The present invention further relates to the use of a cutting tool for machining electrically conductive workpieces, and to a holding device for a workpiece to be machined.

Machining electrically conductive workpieces is being widely in use. For example, lathes and milling machines are utilized for machining metallic workpieces. Of course plastic workpieces, which can also be electrically conductive, may be machined as well. In conventional machining tools, the workpiece is clamped in a holding device, and subsequently an operator carries out the machining operation. This requires some basic knowledge on the part of the operator about the machining operation, even when processing simple workpieces, and moreover requires a continuous presence of the operator during the machining operation. This type of machining operation is appropriate for single pieces, small-scale production and finishing of workpieces, e.g., turning of already used brake disks and brake drums.

Other approaches involve the use of automated machining devices to execute a previously inputted machining program in the absences of an operator. The use of such machining device is economically sensible only when the machining process involves a large-scale production of identical workpieces or complicated special parts.

In particular, when finishing operations of workpieces are involved in order to smoothen the surface, an operator is typically required to provide an optical check of the finished surface so as to ascertain whether the finishing process is completed or needs to be continued. Hereby, it becomes oftentimes necessary to remove the workpiece from the holding device. This is time-consuming and not satisfactory because it frequently happens that existing surface flaws cannot be detected as a consequence of bad light conditions.

German Pat. No. 10 85 009 C describes a device for extending the service life of hard metal tools used in machine tools, whereby thermoelectric currents are compensated at the point of machining between the workpiece and the tool.

U.S. Pat. No. 5,802,937 describes a method for machining surfaces in the nanometer range by applying a closed electric circuit between workpiece and cutting tool and controlling the depth of cut of the cutting tool by compensating a difference between actual value and desired value in the electric circuit.

German Pat. No. 196 33 942 A1 describes a holding device, in particular for a cutter blade, for use in finishing machines and/or machine tools. The holding device is made of electrically conductive material, with at least part of its surface provided with an insulating coating so that an electrical contact is provided between the cutter blade and the holding device to thereby ascertain an engagement of the cutter blade in a workpiece.

It would be desirable and advantageous to provide an improved method to terminate a machining operation of a workpiece surface as soon as a desired surface quality has been realized.

SUMMARY OF THE INVENTION

According to one aspect of the present invention, a method for machining an electrically conductive workpiece with a cutting tool, includes the steps of closing an electric circuit between the tool and the workpiece which is positioned electrically insulated from the tool, when the workpiece is subjected to a machining operation, determining and evaluating at least one electric variable in the electric circuit during the machining operation, advancing the workpiece after each machining step of an entire surface of the workpiece, and terminating the machining operation, when the at least one variable remains substantially constant during a machining step.

The present invention resolves prior art problems by applying an electric circuit between a cutting tool, e.g. a turning tool, and a workpiece to be machined and recognizing that a jump in resistance occurs in response to an area of irregularities in the workpiece surface being machined so that signals fed back during a machining step across the entire surface provide a reflection of the surface quality at that time. The degree of the surface quality can be calibrated beforehand and is commensurate with a degree of constancy of the feedback signal. As soon as the desired surface quality has been reached, the machining operation is terminated.

According to another feature of the present invention, the feedback signal may be a voltage signal, current strength signal or a resistance signal and is determined in the closed electric circuit in response to an electric input voltage or input current strength. Suitably, the input current strength is up to 50 mA. The input voltage may be up to 24 V. The electric current may be applied in an area of the cutting tool or in an area of a holding device of the workpiece. Likewise, the determination of the feedback signal may be realized in an area of the cutting tool or in an area of a holding device of the workpiece.

The method according to the present invention is applicable for machining a cylindrical workpiece, especially brake disks and brake drums.

A cutting tool according to the present invention for machining an electrically conductive workpiece, may be operatively connected in an area of the cutting tool to a current-application device for applying an electric current and/or a device for determining and evaluating at least one electric variable.

According to another aspect of the present invention, a holding device may be used for a workpiece to be machined, whereby a current-application device for applying an electric current and/or a device for determining and evaluating at least one electric variable may be provided in the area of the holding device.

With a method according to the present invention, it is now possible to ascertain with high precision any presence of surface irregularities, such as flutes, of the workpiece during the machining operation and to directly control the machining process in response to the actual condition of the workpiece surface. In particular, it is now possible to automatically terminate the machining process, in the absence of an operator, as soon as the desired surface quality has been accomplished.

Moreover, the method according to the present invention affords the possibility to protect the machine tool through determination of an electric variable, which responds to an electrically conductive body, so that the machine tool can be automatically shutdown or an inquiry can be triggered in the presence of such an electrically conductive body in an unexpected area, e.g. in an area in which the cutting tool is intended to travel.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1b is a perspective illustration of a lathe having incorporated therein a pair of cutting tools of FIG. 1 in a second positional variation;

DETAILED DESCRIPTION OF PREFERRED EMBODIMENTS

Figure 1:
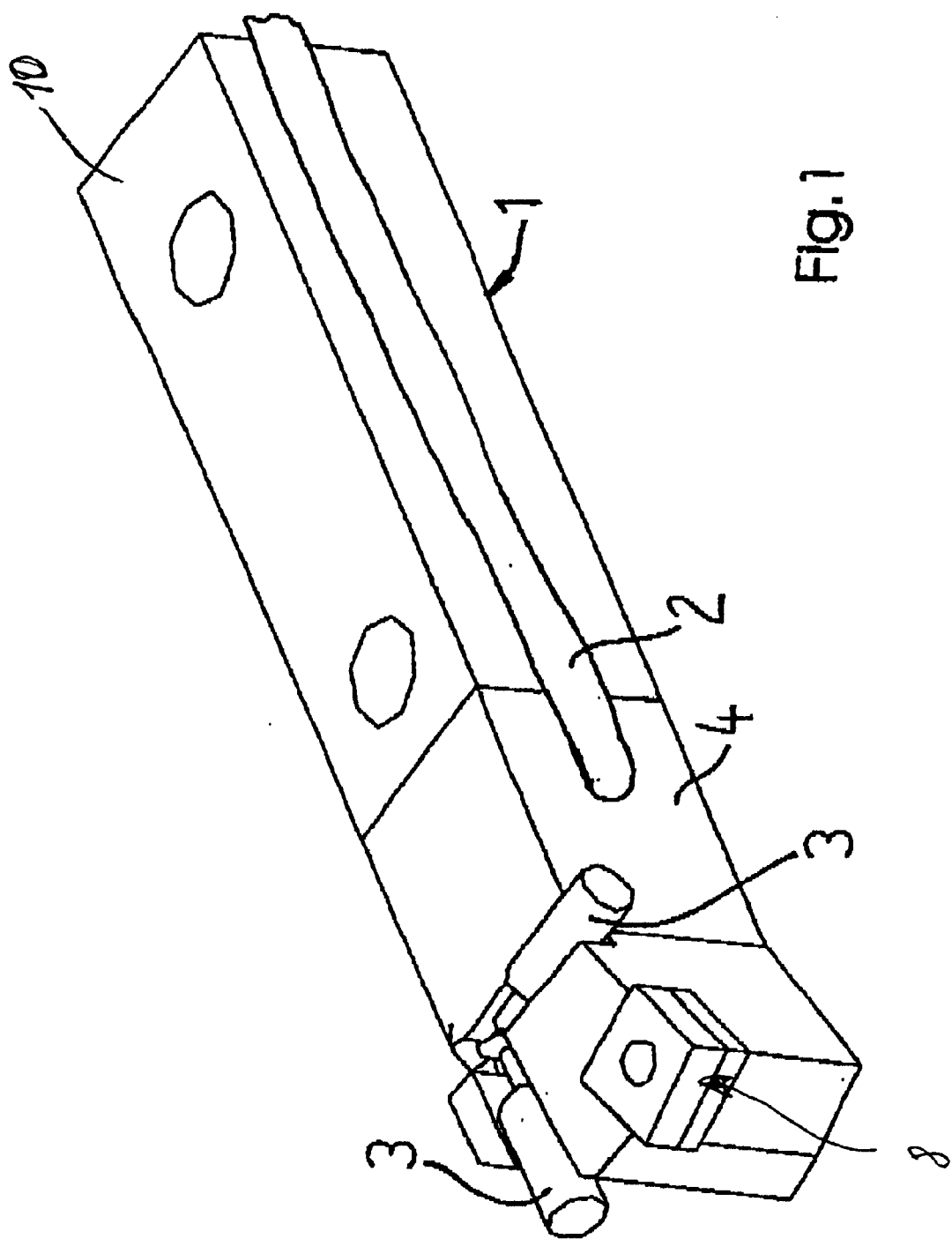
FIG. 1 is a perspective illustration of a cutting tool according to the present invention

Throughout all the Figures, same or corresponding elements are generally indicated by same reference numerals.

Turning now to the drawing, and in particular to FIG. 1, there is shown a perspective illustration of a cutting tool according to the present invention, generally designated by reference numeral 1 and represented here by way of example by a turning tool. The cutting tool 1 has a base body 10 which is made of electrically conductive material and operatively connected to a current-application device, e.g., a cable 2 connected to a, not shown, power source, for applying a voltage of, e.g. 5V, across the cutting tool 1 so as to establish an electric circuit between the cutting tool 1 and a workpiece 5 (FIG. 1a) which is made of electrically conductive material but electrically insulated from the cutting tool 1, and is held in a holding device 6. The workpiece 5 is rotated under power against blade 8 of the cutting tool 1 for carrying out the desired machining operation.

Figure 3:
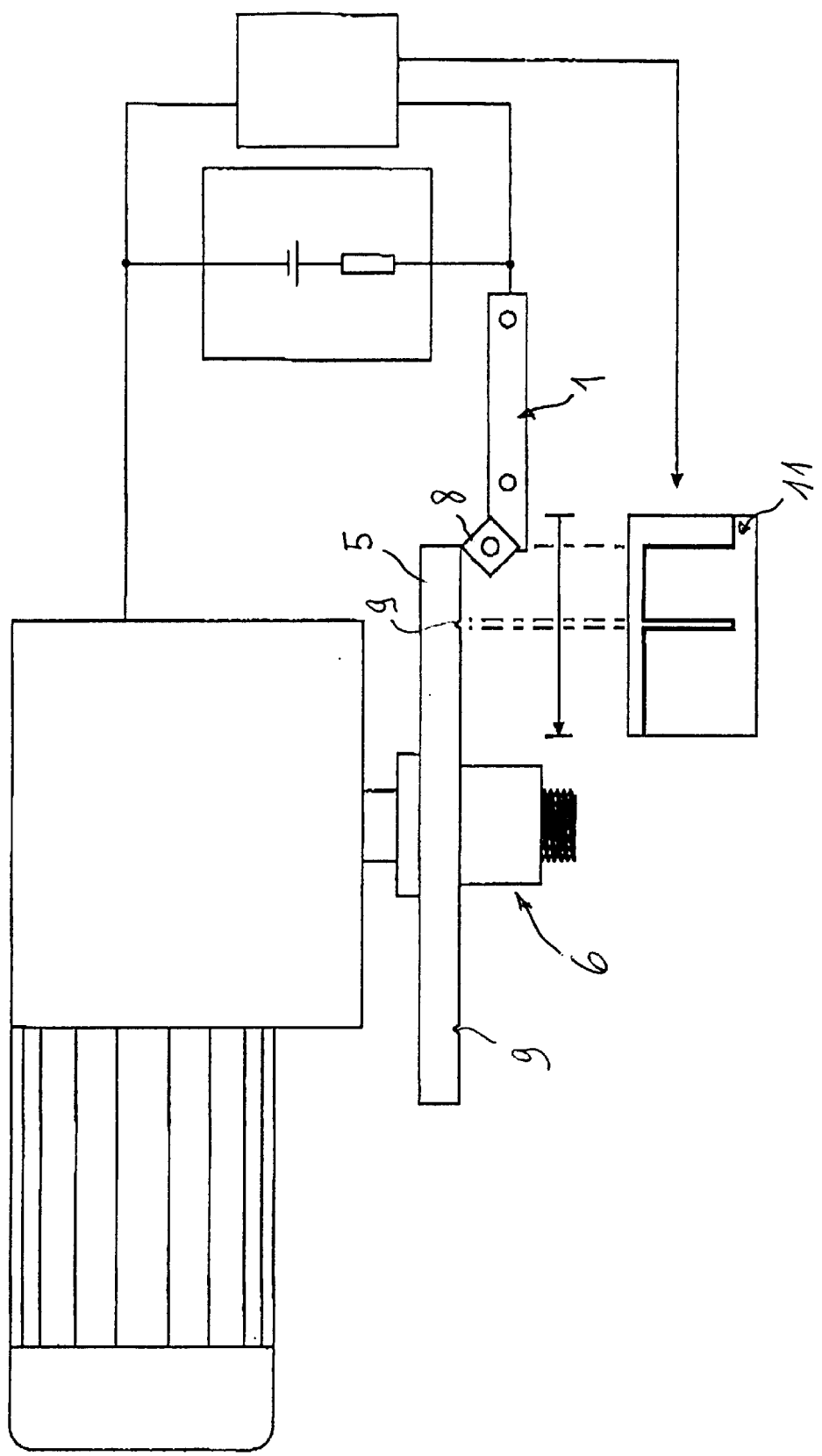
FIG. 3 is a principal illustration of a circuit diagram, incorporating the subject matter of the present invention.

The application of voltage via the cable 2 may be realized in the area of the cutting tool 1, e.g. in the forward region 4 of the cutting tool 1, as shown in FIG. 1, whereby the forward region 4 of the cutting tool 1 is electrically insulated from the rearward region. Of course, the application of voltage may be realized in the area of the workpiece 5. Suitably, a constant voltage of about 5 V is applied across the cutting tool 1, preferably with subsequent resistor, while the remaining voltage and/or resistance can be measured in the area of the workpiece 5 or the holding device 6. A principal circuit diagram is shown in FIG. 3.

At machining operation, the electric circuit between the cutting tool 1 and the workpiece 5 is closed. As soon as the cutting tool 1 is in registry with a flute or groove in the surface of the workpiece 5, shown schematically and exaggerated in FIG. 3 by reference numeral 9, the contact between the cutting tool 1 and the workpiece 5 is interrupted so that the resistance suddenly surges. The surge in resistance is shown in FIG. 3 by graph 11. This effect is now exploited by measuring the presence of significant surges during the machining process and thereby determine whether the machining process should be continued, repeated or stopped. It is hereby possible to determine the voltage, strength of current and resistance between cutting tool 1 and workpiece 5 when applying a certain, preferably constant, input voltage or input current.

Figure 1A:
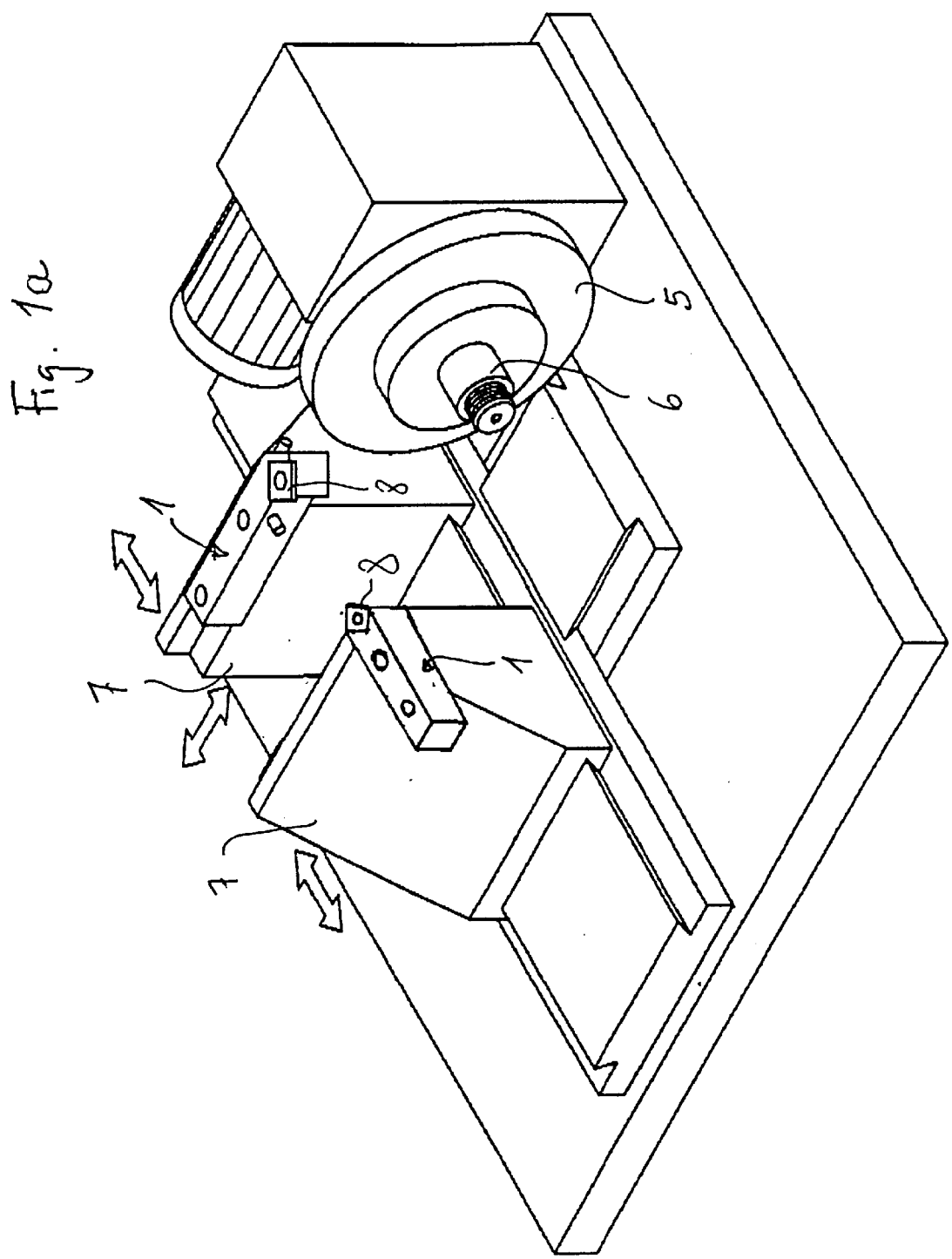
FIG. 1a is a perspective illustration of a lathe having incorporated therein a pair of cutting tools of FIG. 1 in a first positional variation.

In the non-limiting example of FIG. 1, the cutting tool 1 is additionally provided with a distance meter 3 for detecting a distance of the cutting tool 1 from the workpiece 5. When using two such cutting tools 1 in 90° offset relationship, as shown in FIG. 1a, and disposed on carriages 7, which, preferably, can travel independently from one another, one cutting tool 1 can be used to machine an end face of the workpiece 5, e.g. a cylindrical object, whereas the other cutting tool 1 can be used to machine the side surfaces of the workpiece 5. Of course, a single cutting tool 1 having two cutter blades 8 in 90° offset disposition may also be used to properly carry out the machining steps. Another positional variation is shown, by way of example, in FIG. 1b in which the cutting tools 1 are in parallel relationship, whereby the blades 8 are arranged in 90° offset disposition.

The provision of the distance meters 3 allows also the detection of dimensions, e.g. diameter, width, of the workpiece 5 by advancing the cutting tool 1 in the direction of the workpiece 5 until the distance decreases to zero or a distance measurement becomes possible, whereby the dimensions of the workpiece 5 can be ascertained by the registered distance traveled by the cutting tool 1 and, optionally, by the measurement of the still remaining distance. The distance meters 3 may also be used to stop the cutting tool 1 in time to prevent a too forceful advance of the cutting tool 1 toward the workpiece 5, e.g., as a result of an operating mishap, and thereby to avoid damage to the workpiece 5 and the cutting tool 1.

After being clamped in the holding device 6, the workpiece 5, especially a cylindrical workpiece, can be machined in a fully automated manner in conjunction with the detection process according to the present invention. This is true, even when the workpieces 5 have different dimensions, e.g. turning of already used brake disks or brake drums. The machining process is hereby as follows for an apparatus with two cutting tools 1, of which one is oriented in the axis of the workpiece 5 to be machined, and the other one is oriented in the plane of the workpiece 5, as shown in FIG. 1a. Both cutting tools 1 are moved by a traveling mechanism (carriage 7) in the direction of the workpiece 5 until a diameter measuring device, e.g. a light barrier, has ascertained the diameter of the workpiece 5. In this position, at least one of the cutting tools 1 is moved to the workpiece 5 until the distance meter 3 has established a defined distance. The workpiece 5 is then rotated, and, as the distance meters 3 slowly move sideways, it is determined when (via a revolution of the workpiece 5) the distance meters 3 respectively are positioned permanently in front of the workpiece 5. In this manner, out-of-round (ovalness) and fluctuations in thickness or wobble (unevenness in direction of the plane) of the workpiece 5 can be ascertained.

The actual machining operation is carried out by applying a voltage of, e.g., 5 V in the area of the cutting tool 1 across a voltage multiplier, and determining the voltage between the cutting tool 1 and the workpiece 5, while material is removed in layers from the end face and/or side surfaces of the workpiece 5. The cutting tool 1 is advanced after each material layer removal, until no voltage surge or resistance surge as a consequence of existing flutes 9 can be registered or is below acceptable tolerance limits. This concludes the machining process, and the cutting tools 1 return to their idle position.

Figure 2A:
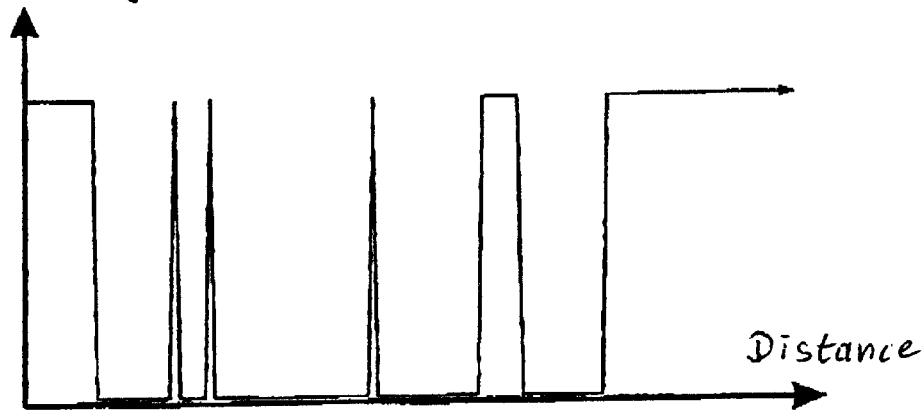
FIGS. 2a, 2b, 2c are graphical illustrations showing voltage-distance diagrams ascertained in different phases by the cutting tool according to the invention during the machining process.
Figure 2B:
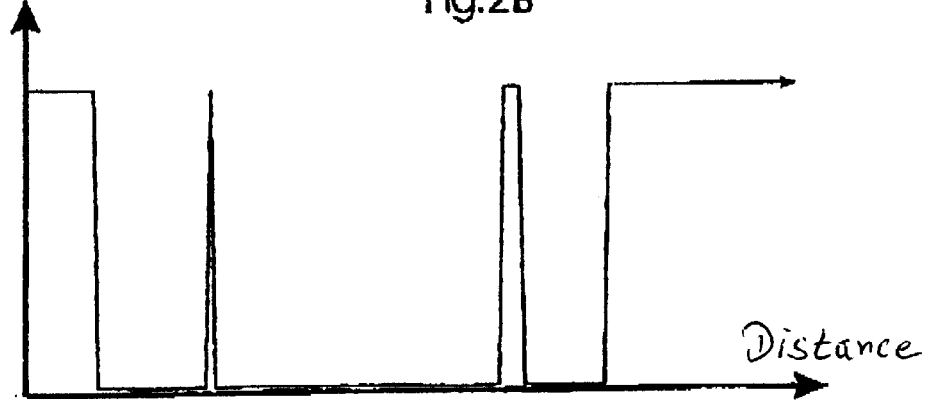
Figure 2C:
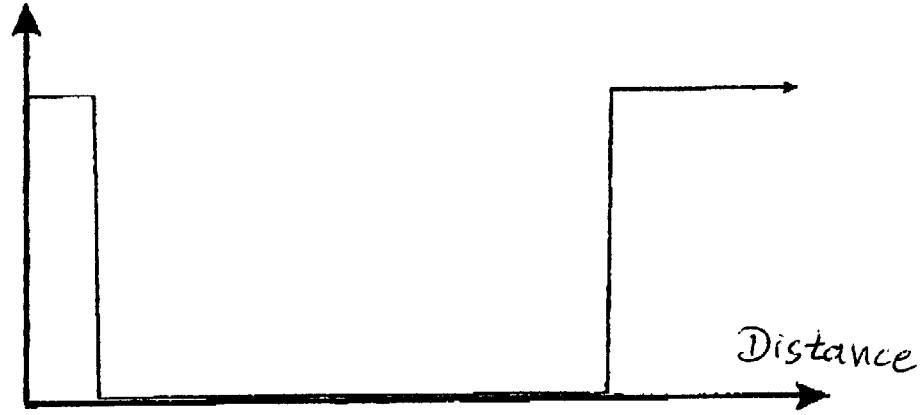

FIGS. 2a to 2c depict graphical illustrations showing voltage-distance diagrams ascertained at different phases by the cutting tool 1 according to the invention during the machining process. FIG. 2a shows the voltage-distance diagram as a function of the radius of the workpiece 5 at the beginning of the machining operation, i.e. material removal of the first surface layer. There are shown three small voltage surges, commensurate with the presence of three small flutes 9 in the workpiece surface, and one greater voltage surge, commensurate with the presence of a greater flute in the workpiece surface. As a result of a following machining step, a second layer of material is removed, resulting in a voltage-distance diagram as shown in FIG. 2b, in which the presence of only one small flute, i.e. the deepest flute, and the greater flute are indicated by the corresponding voltage surges. The end of the machine operation is reached, e.g. after removal of a third surface layer, when no voltage surges are registered, as indicated in FIG. 2c.

In this way, a simple, fully automated machining process is realized, without requiring a programming of the overall apparatus, and without need for the presence of an operator (except, of course, for clamping and disengaging the workpiece). The machining process according to the present invention results in cost-efficient operation with constant, objective quality, even when different single pieces are involved, such as turning of already used brake disks in the workshop.

While the invention has been illustrated and described as embodied in a method for machining electrically conductive workpieces with a cutting tool, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for machining an electrically conductive workpiece with a cutting tool, comprising the steps of:

closing an electric circuit between the cutting tool and the workpiece which is positioned electrically insulated from the cutting tool, when the workpiece is subjected to a machining operation;

determining and evaluating at least one electric variable in the electric circuit during the machining operation;

advancing the workpiece after each machining step of an entire surface of the workpiece; and terminating the machining operation, after the at least one variable is determined as substantially constant during a machining step.

2. The method of claim 1, wherein the variable is a quantity selected from the group consisting voltage, strength of current and resistance and determined in the closed electric circuit in response to an electric input voltage or input current strength.

3. The method of claim 2, wherein the input current strength is up to 50 mA.

4. The method of claim 2, wherein the input voltage is up to 24 V.

5. The method of claim 1, wherein electric current is applied in an area of the cutting tool or in an area of a holding device of the workpiece.

6. The method of claim 1, wherein the determining step is realized in an area of the cutting tool or in an area of a holding device of the workpiece.

7. The method of claim 1, wherein the cutting tool is a turning tool.

8. The method of claim 1 for making cylindrical workpieces.

9. The method of claim 1 for making brake disks and brake drums.

10. A method of using a cutting tool for machining an electrically conductive workpiece, comprising:

providing in an area of the workpiece a current-application device for closing an electric circuit between the cutting tool and the workpiece, which is positioned electrically insulated from the cutting tool, when the workpiece is subjected to a machining operation;

providing in the area of the workpiece a device for determining and evaluating at least one electric variable in the electric circuit during the machining operation;

advancing the workpiece after each machining step of an entire surface of the workpiece; and terminating the machining operation, after the at least one variable is determined as substantially constant during a machining step.

11. The method of claim 10, wherein the cutting tool is a turning tool.

12. A method of using a holding device for a workpiece to be machined, comprising:

providing in an area of the holding device a current-application device for closing an electric circuit between the cutting tool and the workpiece, which is positioned electrically insulated from the cutting tool, when the workpiece is subjected to a machining operation;

providing in the area of the holding device a device for determining and evaluating at least one electric variable in the electric circuit during the machining operation;

advancing the workpiece after each machining step of an entire surface of the workpiece; and terminating the machining operation, after the at least one variable is determined as substantially constant during a machining step.

* * * * *